March 15, 1927.

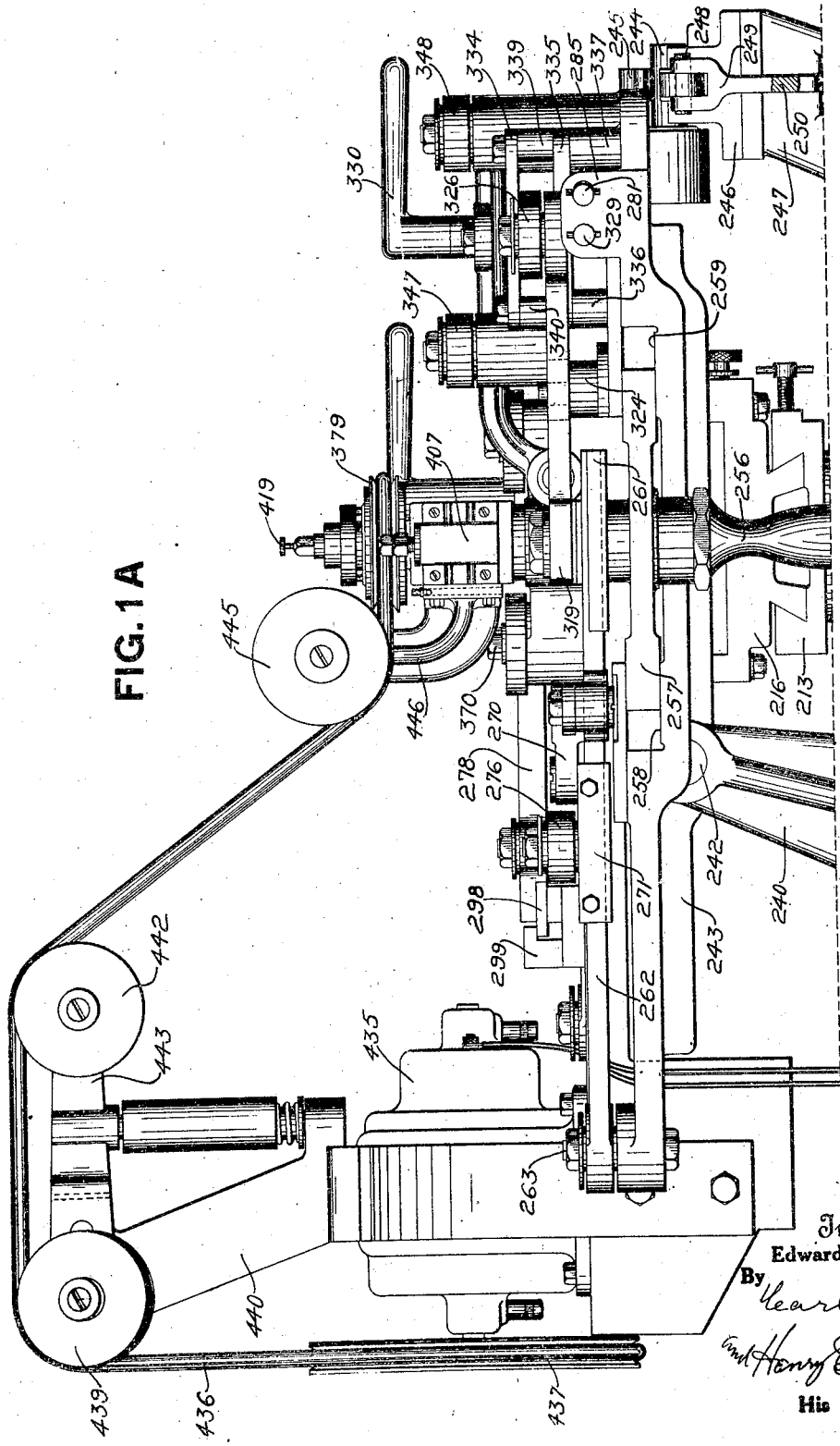

E. H. KUHLMAN 1,620,975

ENGRAVING MACHINE

Filed March 18, 1922

Inventor
Edward H. Kuhlman
By
His Attorneys

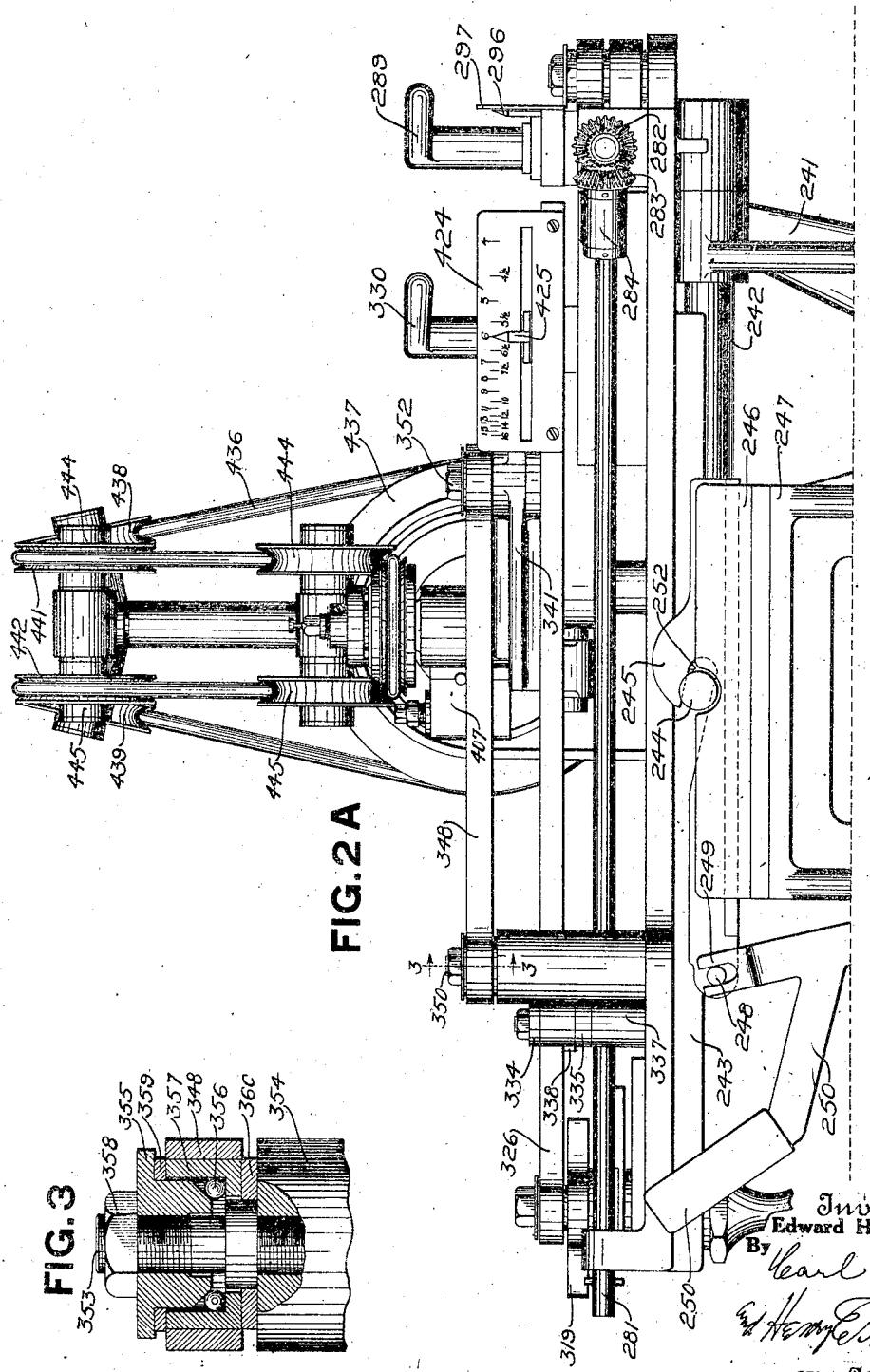

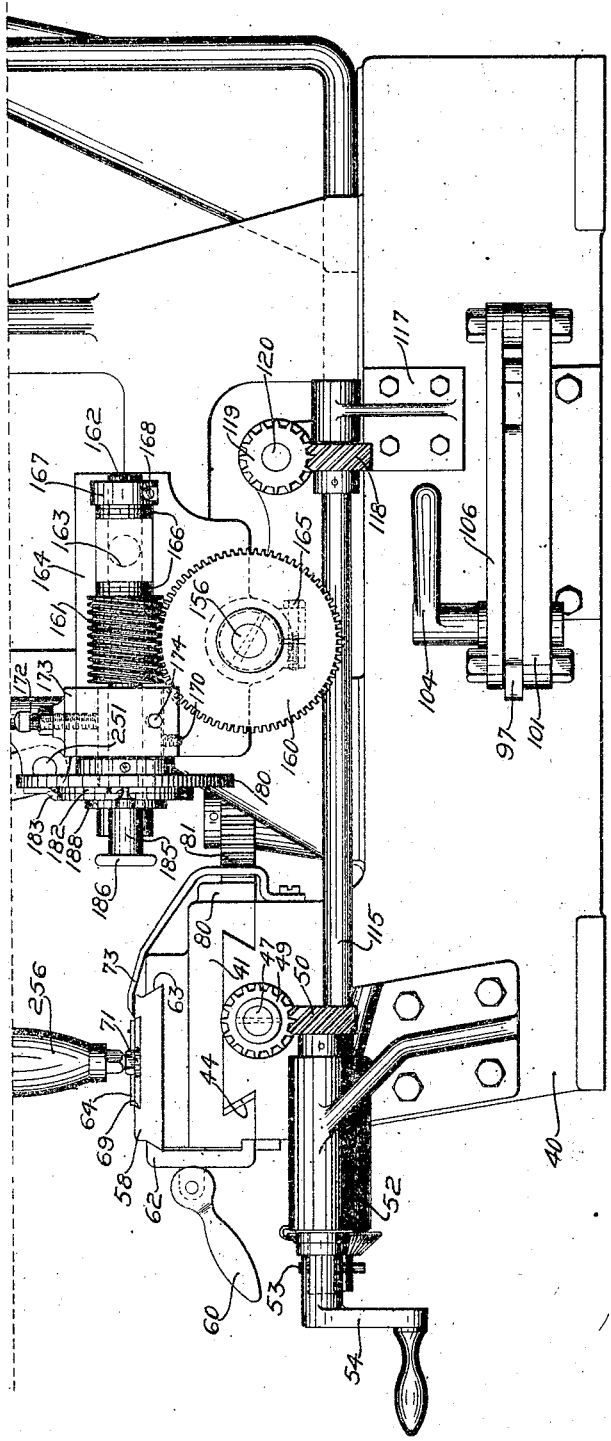

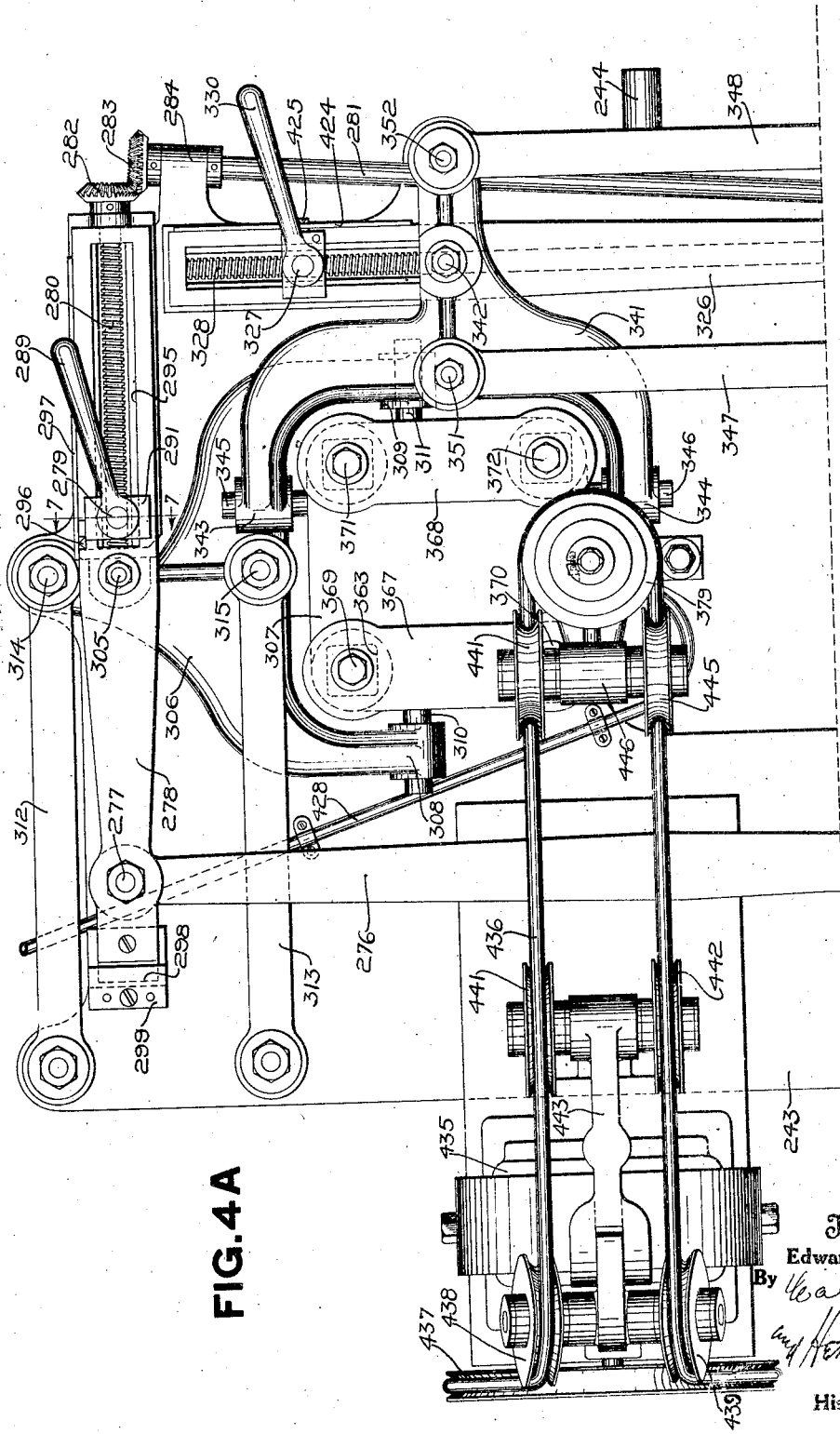

March 15, 1927.   E. H. KUHLMAN   1,620,975
ENGRAVING MACHINE
Filed March 18, 1922   13 Sheets-Sheet 6
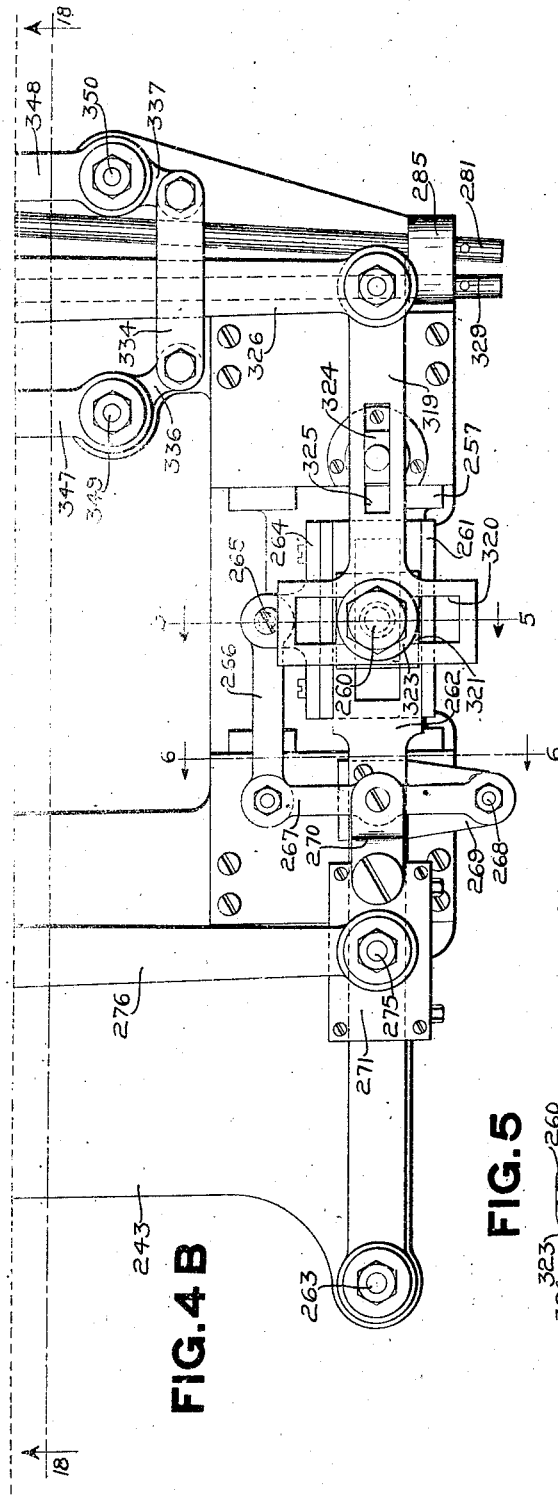
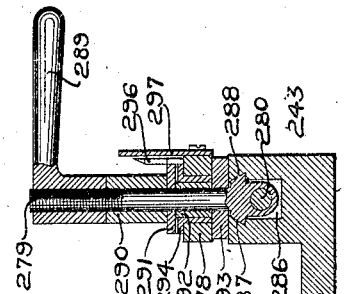
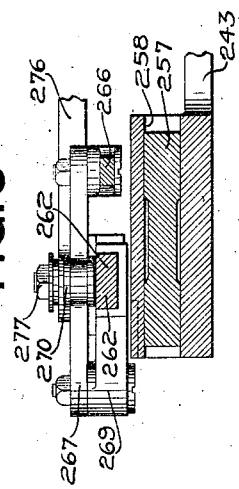
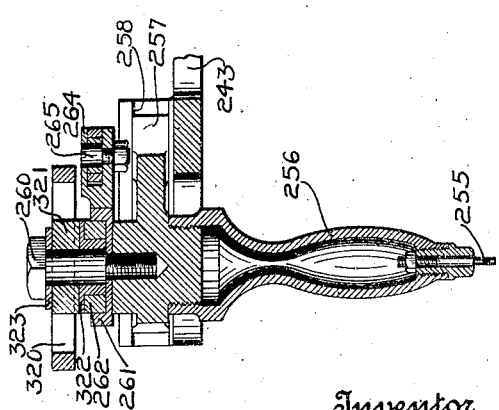
Inventor
Edward H. Kuhlman
By Carl Beust
and Henry C. Stauffer
His Attorneys

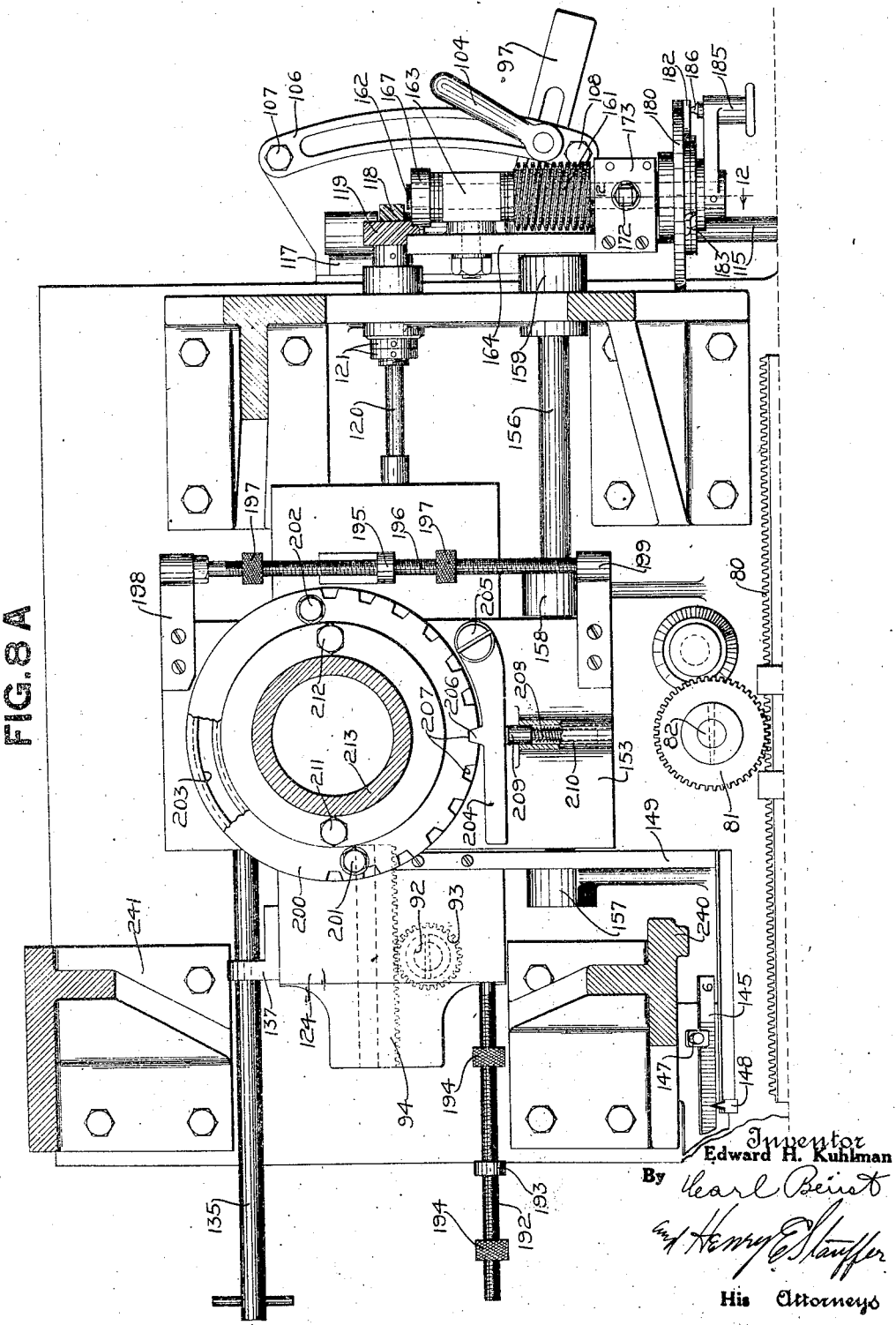

March 15, 1927. 1,620,975
E. H. KUHLMAN
ENGRAVING MACHINE
Filed March 18, 1922   13 Sheets-Sheet 8
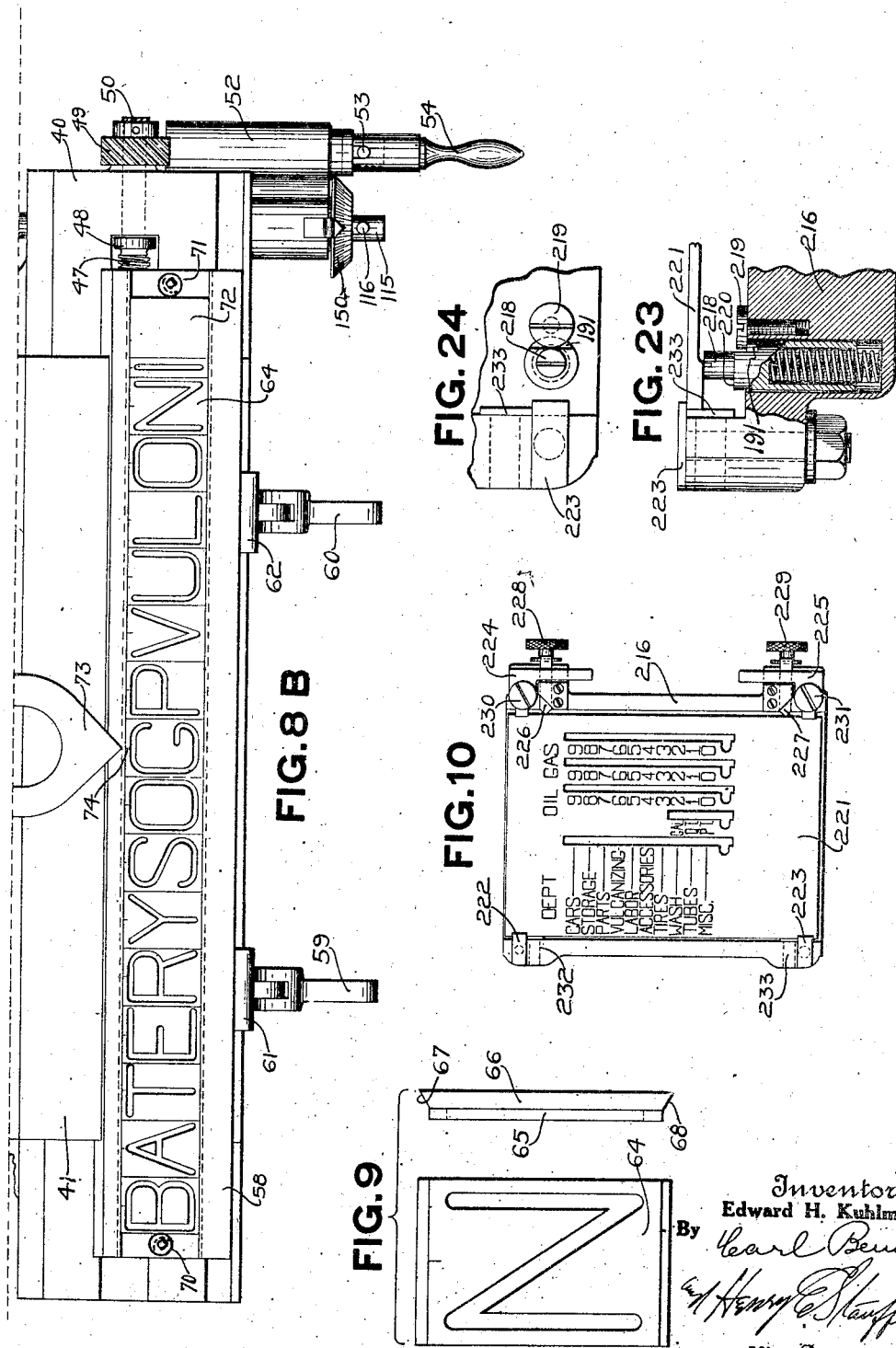

March 15, 1927.
E. H. KUHLMAN
ENGRAVING MACHINE
Filed March 18, 1922
1,620,975
13 Sheets-Sheet 9
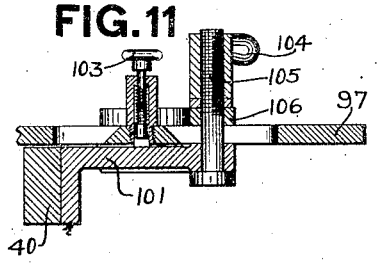
FIG. 11
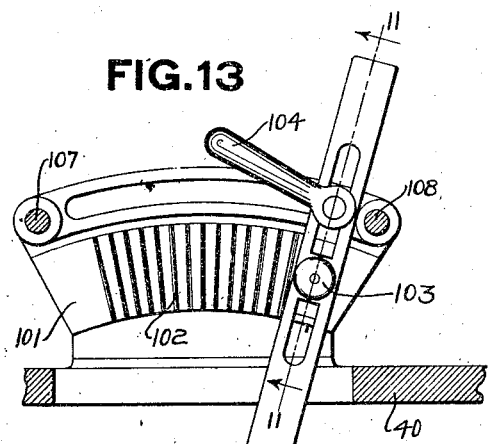
FIG. 13
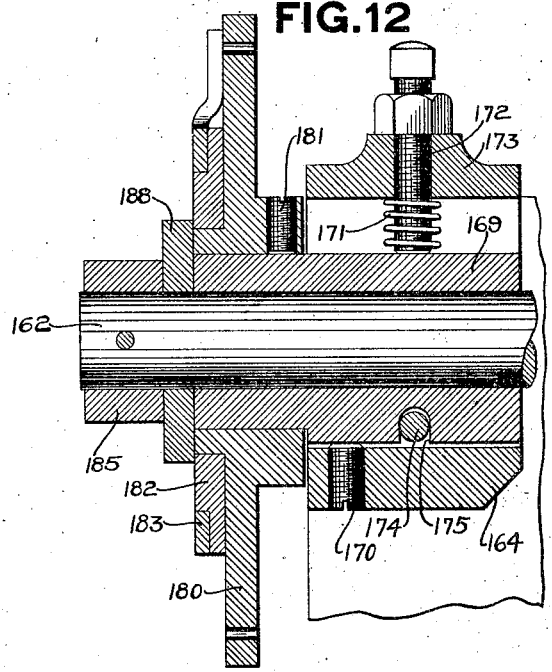
FIG. 12
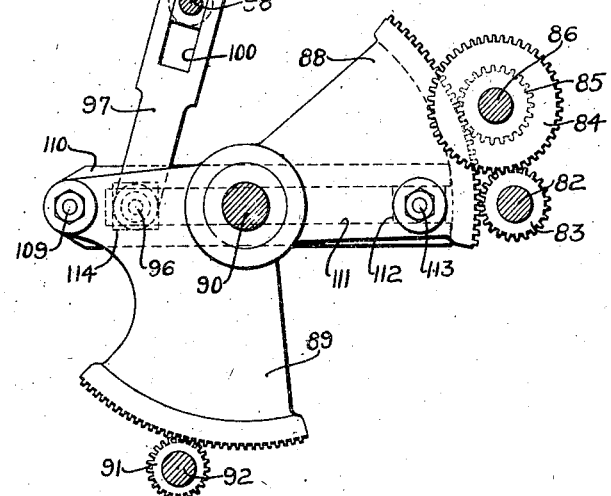
Inventor
Edward H. Kuhlman
By Carl Beust
Henry E. Stouffer
His Attorneys March 15, 1927.  E. H. KUHLMAN  1,620,975
ENGRAVING MACHINE
Filed March 18, 1922   13 Sheets-Sheet 10
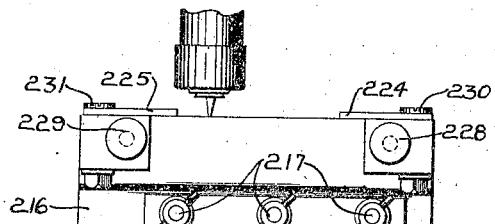
FIG. 14
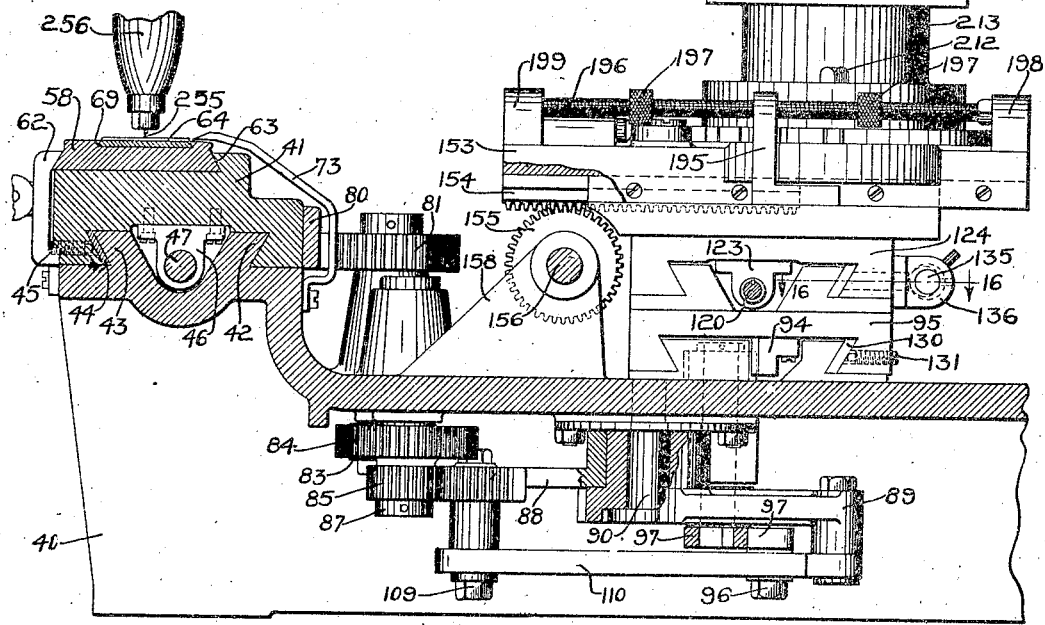
FIG. 15
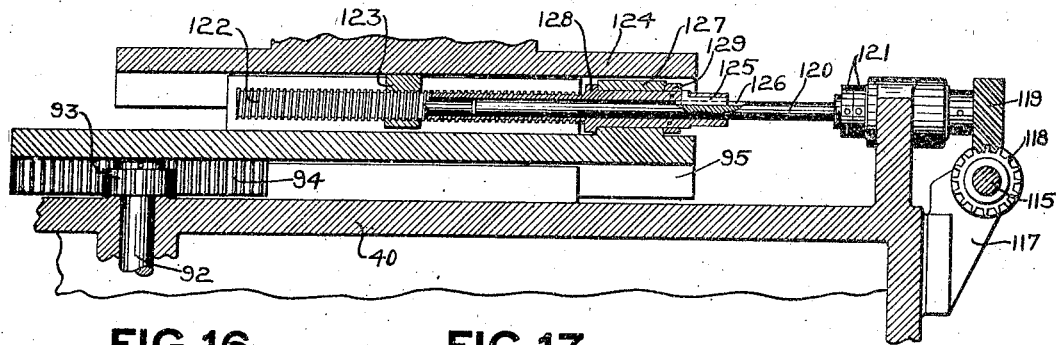
FIG. 16   FIG. 17
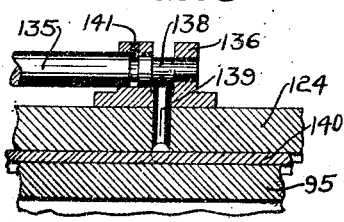
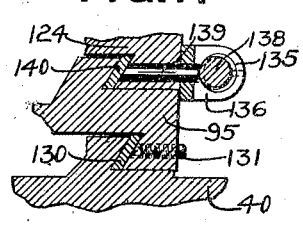
Inventor
Edward H. Kuhlman
By
His Attorneys March 15, 1927.
E. H. KUHLMAN
1,620,975
ENGRAVING MACHINE
Filed March 18, 1922    13 Sheets-Sheet 11
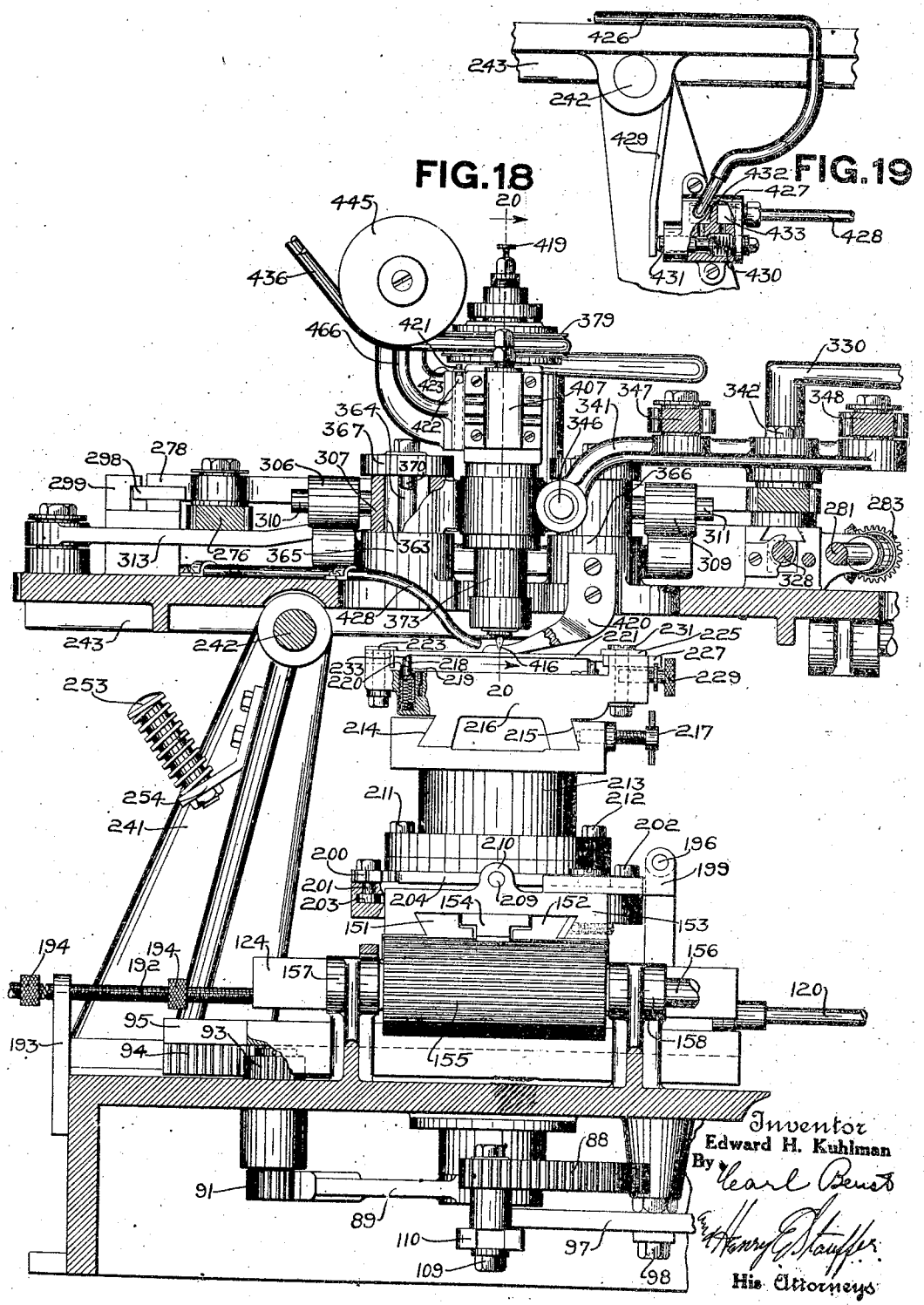

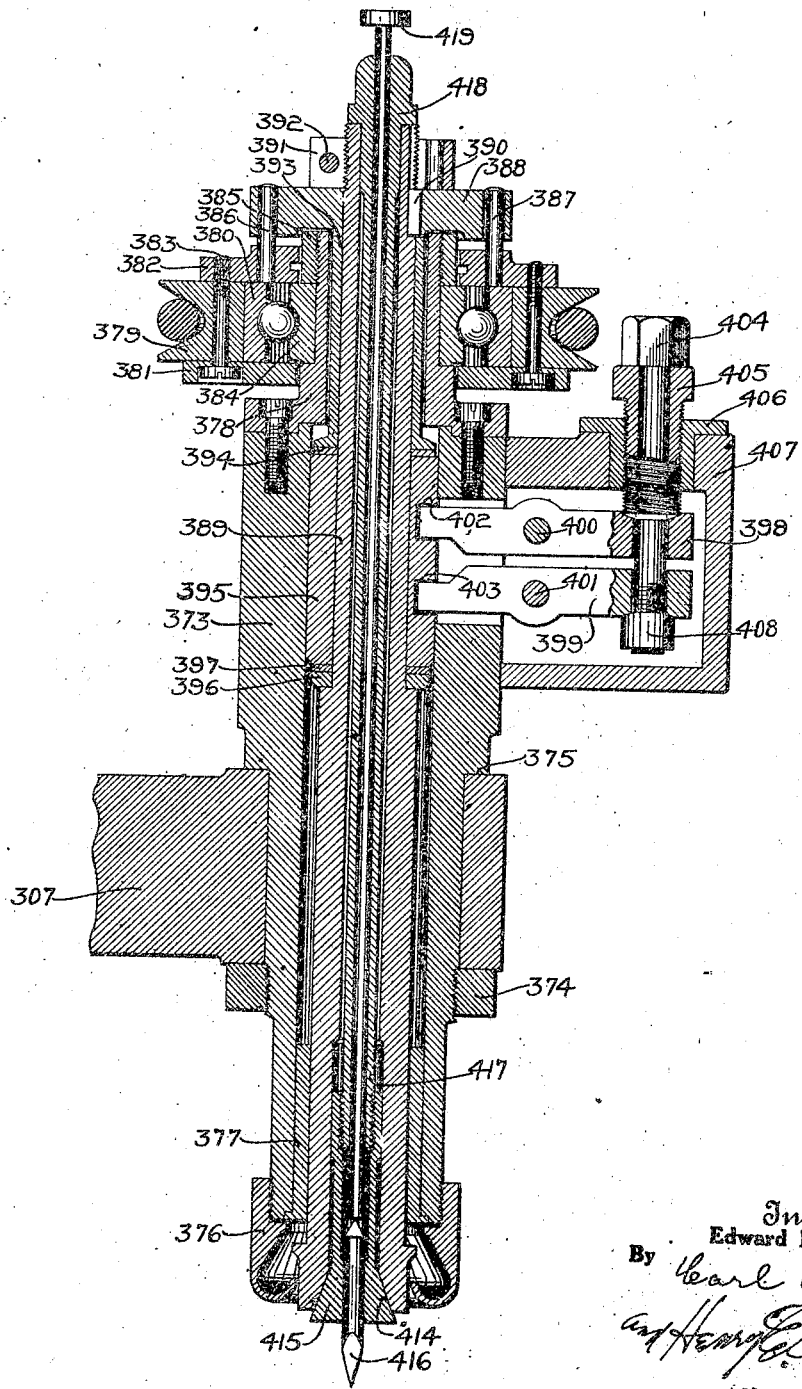

March 15, 1927.  E. H. KUHLMAN  1,620,975
ENGRAVING MACHINE
Filed March 18, 1922    13 Sheets-Sheet 13

Inventor
Edward H. Kuhlman
By
His Attorneys

Patented Mar. 15, 1927.

1,620,975

UNITED STATES PATENT OFFICE.

EDWARD H. KUHLMAN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

ENGRAVING MACHINE.

Application filed March 18, 1922. Serial No. 544,838.

This invention relates to improvements in engraving machines, and has more particular relation to improvements in such machines as are designed to engrave designs, configurations, characters, or the like.

One of the objects of this invention is to engrave designs, configurations, characters or the like of various proportions from the same master plates.

Another object of the invention is to provide a machine whereby a master pattern, which may be carefully designed and executed by hand, can be used as a guide from which duplicates of different proportions can be made, thus securing all of the benefits of careful hand work for the design and all of the benefits of machine work for turning out the duplicates themselves.

Another object of the invention is to provide adjustable mechanism which will cause the cutting tool to move universally in a horizontal plane a proportionately less amount than the tracing tool.

Another object of the invention is to provide manipulative mechanism to predetermine the relatively proportional lateral movement between the master plate holder and the work piece supporting member when operated in unison by a common operating device.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification, Of said drawings:

Fig. 1$^A$ and 1$^B$ taken together constitute a front elevation of the machine.

Figs. 2$^A$ and 2$^B$ taken together constitute a right side elevation of the machine.

Fig. 3 is an enlarged detail sectional view of a bearing taken on the line 3—3 of Fig. 2$^A$.

Figs. 4$^A$ and 4$^B$ taken together constitute a plan view of the machine.

Fig. 5 is a sectional view of the tracing pin holder taken on the line 5—5 of Fig 4$^B$.

Fig. 6 is a sectional view taken on the line 6—6 of Fig. 4$^B$.

Fig. 7 is a sectional view taken on the line 7—7 of Fig. 4$^A$.

Figure 1B:
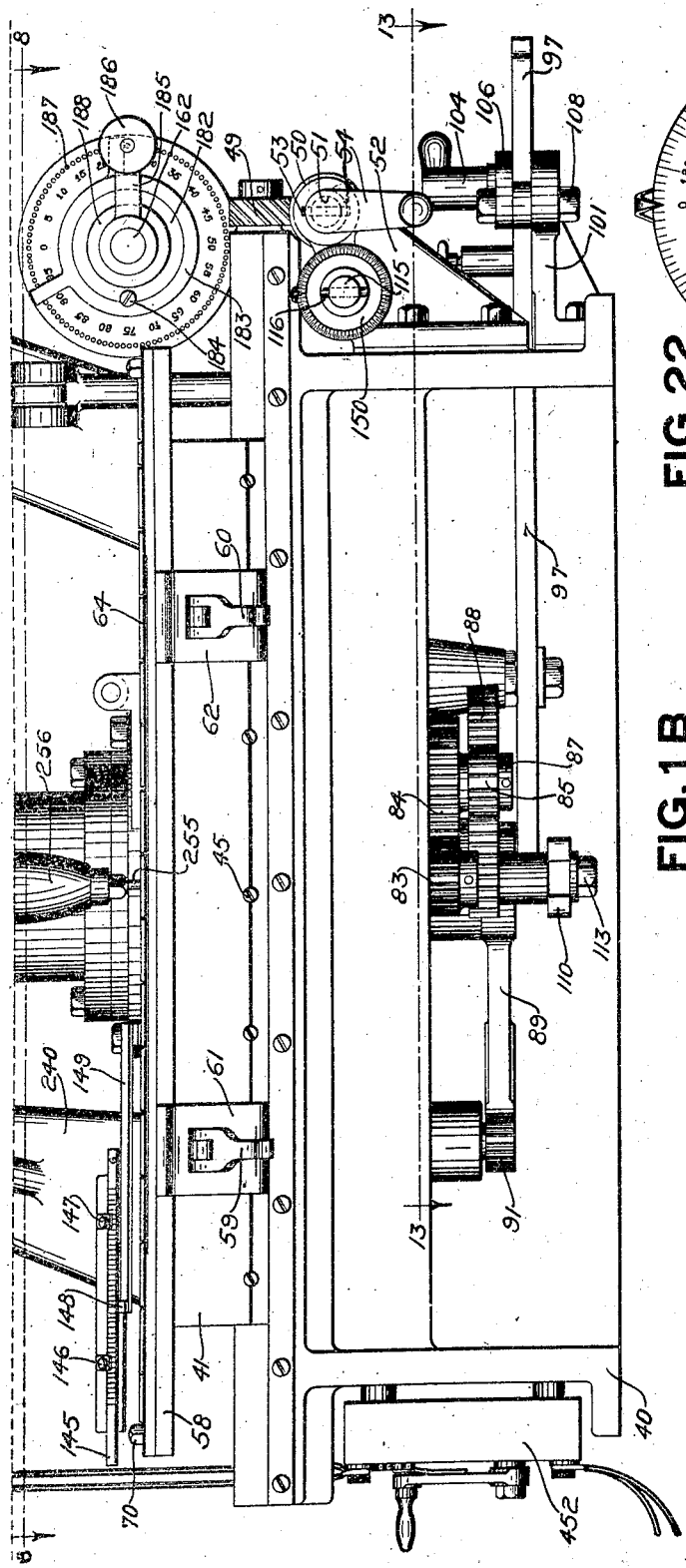

Figs. 8$^A$ and 8$^B$ taken together constitute a sectional plan view on line 8—8 of Fig. 1$^B$.

Fig. 9 shows different views of a master character pattern.

Fig. 10 is a plan view of a work piece held in the engraving fixture.

Fig. 11 is a sectional view taken on the line 11—11 of Fig. 13.

Fig. 12 is an enlarged detail sectional view taken on the line 12—12 of Fig. 8$^A$.

Fig. 13 is a partial sectional view taken on the line 13—13 of Fig. 1$^B$.

Fig. 14 is a partial sectional view showing in part the master carriage and turret operating mechanism.

Fig. 15 is a partial sectional view of the turret lateral moving mechanism.

Fig. 16 is a partial sectional view taken on the line 16—16 of Fig. 14.

Fig. 17 is a partial transverse sectional view of the mechanism shown in Fig. 16.

Fig. 18 is a partial sectional view taken on the line 18—18 of Fig. 4$^B$.

Fig. 19 is a detail view of the air valve.

Fig. 20 is an enlarged sectional view of the cutting tool spindle taken on the line 20—20 of Fig. 18.

Figure 21:
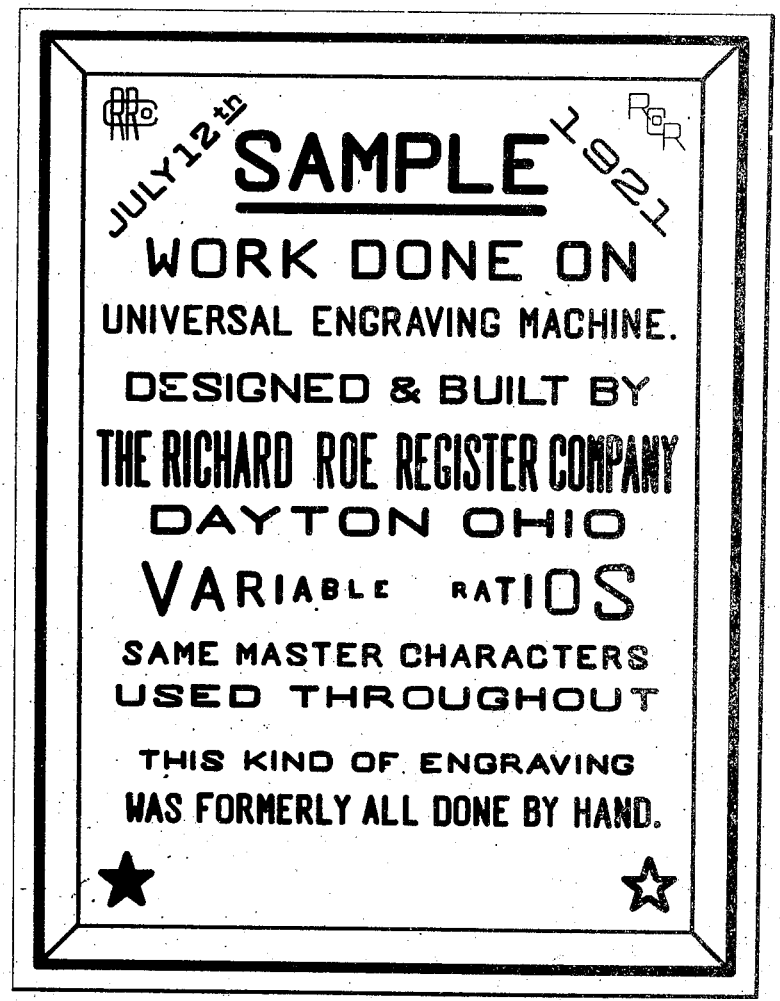

Fig. 21 is a view showing a work piece engraved by the machine.

Figure 22:
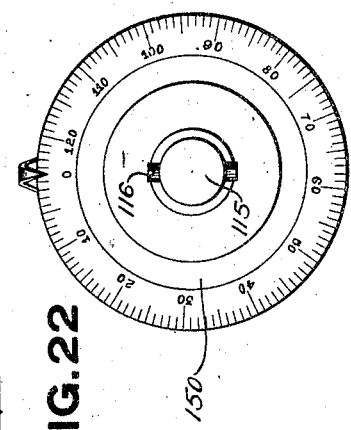

Fig. 22 is an enlarged detail view of the index dial for controlling lateral movement to the work piece supporting member.

Fig. 23 is a fragmentary detail view of the work piece engraving fixture.

Fig. 24 is a plan view of the parts shown in Fig. 23.

Described in general terms, the embodiment of the invention disclosed comprises a laterally slidable pattern supporting table connected with a work piece supporting member with operating means for operating the work piece supporting member in unison with the slidable pattern supporting table, and other operating means for operating the work piece supporting member independently of the pattern supporting table, and a tracing pin supporting member adapted to be given a universal movement in horizontal plane and operatively connected by an adjustable mechanism with a cutting tool supporting member to move the same in unison therewith.

Described in detail, the machine comprises a frame 40 upon which is mounted a master plate support 41 (Figs. 1$^B$, 2$^B$, 8$^B$ and 14). This support is grooved on the under side to cooperate with inclined guides 42 and 43 formed in the frame to permit a lateral sliding movement of the master plate support. A plate 44 inserted between the master plate support and the inclined guide 43 cooperates with adjusting screws 45 to take up lost motion caused by wear of parts.

Fastened to the under side of the master plate support is a bracket 46 which has a threaded hole cooperating with a screw 47 which in rotating gives a lateral movement to the master plate support. This screw is journaled near the right hand end in the frame 40 and has a flange 48 to take the right hand thrust against the frame. Fastened on the right hand end of the screw 47 and outside of the frame is a spiral gear 49 meshing with a companion spiral gear 50, this latter gear being secured to a shaft 51, journaled in a bracket 52 attached to the frame. Near the front end of this shaft is a projecting pin 53 which engages with a slot in a detachable handle 54. The turning of this handle will cause the master plate support to move laterally in the direction desired.

Fitted to the top surface of the master plate support (Fig. 2$^B$) is a master plate holder 58 which may be moved to various lateral positions and which is secured in position by two eccentric levers 59 and 60 cooperating with clamps 61 and 62 respectively. The lower ends of the clamps rest against the master plate support, with the upper ends pressing against a bevel edge of the master plate holder, forcing the opposite side against an angle face 63 formed on the master plate support.

The master plate holder is adapted to hold one or more master plates 64, as shown in Fig. 8$^B$. These master plates, as shown by enlarged view in Fig. 9, consist of two parts. The upper part 65, in which the design is formed, is a hardened plate secured to another plate 66 which has two beveled edges 67 and 68. These beveled edges are formed to fit a groove 69 cut in the top surface of the master plate holder. The master plates are firmly held in position by eccentric pins 70 and 71 placed near each end of the holder. When there are not enough master plates used to fill the holder, spacing plates 72 are used to make up the difference in space.

A locating pointer 73 which is fastened to the frame is used in positioning the master plates by bringing into alinement with the pointer a short vertical line 74 placed in the center near the top edge of each master plate. The master plates are positioned either by releasing the clamps and sliding the holder or by turning the handle 54 and moving the master plate support.

When the master plate support is moved laterally by turning the handle 54 a work piece supporting member is simultaneously moved in a like direction but a proportionately less distance which is predetermined by a manipulative device. The mechanism connecting these two elements together comprises a rack 80 (Fig. 8$^A$) fastened to the rear side of the master plate support with which meshes a gear 81 pinned to the upper end of a vertical shaft 82 which is journaled in the frame. Fastened to the lower end of the shaft is a pinion 83 (Figs. 13 and 14) meshing with a gear 84 which is fastened to a pinion 85 freely mounted on a vertical stud 86 projecting downwardly from the frame. A collar 87 pinned to the stud 86 retains the gear and pinion on the stud. The pinion 85 meshes with a segment 88 which is freely mounted upon the hub of a segment lever 89 freely mounted upon a stud 90 projecting downward from the frame. This segment lever meshes with a gear 91 which is fastened to the lower end of a vertical shaft 92 journaled in the frame. Upon the upper end of this shaft is a pinon 93 (Fig. 18) which is in mesh with a rack 94 fastened to the lower side of a laterally sliding member 95 which is a part of the work piece supporting member.

The motion of the segment 88 (Fig. 13) is conveyed to the segment lever 89 by an adjustable fulcrum mechanism which permits various ratios of movement between the segment and the segment lever, thereby affording various differences of lateral movement between the master plate holder and the work piece supporting member.

Pivoted to the segment lever 89 by a bolt 109 is an arm 110 having a slot 111 engaging with a bearing block 112 freely mounted upon a vertical bolt 113 fast in the segment 88. There is also a movable fulcrum for the arm 110 engaging with the slot 111. A bearing block 114 freely mounted upon a bolt 96 one end of which is fastened in an indexing lever 97 is free to slide in the slot 111. A lever 97 is fulcrumed on a bolt 98 which is secured in the frame and has a bearing block 99 freely mounted on the same and engaging with an opening 100 formed in the lever 97. The lever 97 extends through the right hand side of the frame of the machine, where it cooperates with a graduated index plate 101 (Figs. 1$^B$, 13 and 14) in predetermining the ratio of movement between the master plate holder and the work piece supporting member. The graduated index plate 101 has a number of radial grooves 102 in which a spring-pressed plunger 103 engages to properly locate the lever 97 in moving from one position to another. After the lever has been positioned it is securely held by a locking arm 104 which is threaded to cooperate with a screw stud 105 (Fig. 11) in clamping the lever between the index plate and a guide plate 106 which is fastened to the index plate by two bolts 107 and 108.

Referring to Fig. 13, the lever 97 is shown in position to give the greatest ratio of lateral movement between the master plate support and the work piece supporting member, which is sixteen to one. To change the ratio the locking arm 104 is loosened to permit moving the lever in a counterclockwise direction to a selected ratio on the index plate. In moving the lever the fulcrum point 96 for the arm 110 will move toward the segment pivotal point 90 and thus change the leverage condition between the segment 88 and the segment lever 89. Should the lever be moved in a counterclockwise direction to the last index position, the fulcrum point 96 will be placed concentric with the segment pivotal point 90, which gives the smallest ratio of lateral movement between the parts previously mentioned, which is four to one.

The means for moving the master plate support and the work piece supporting member is used generally in engraving a design that is continuous from left to right, such as script, and not when engraving separate characters, as shown in Fig. 8ᴮ, unless it be work that is very exacting.

When engraving separate characters the method generally employed is to release the clamps 61 and 62 (Fig. 8ᴮ) and slide the master plate holder 58 either to the right or left to place the character in alinement with the pointer 73. After this the operating handle 54, which is universally used in operating the various parts of the machine, is placed on the forward end of a shaft 115 to cooperate with a pin 116 projecting from the shaft in order to rotate the shaft in either direction. The shaft is journaled in the bracket 52 at its forward end and a bracket 117 (Fig. 2ᴮ) at the rear end.

Fastened to the shaft 115 near the rear end is a spiral gear 118 meshing with a companion spiral gear 119 (Fig. 8ᴬ) which is fastened on the right hand end of a shaft 120 journaled in the frame. Two jam nuts 121, together with the gear 119 prevent any lateral movement of the shaft.

The purpose of the shaft 120 is to rotate a screw 122 (Fig. 15) which cooperates with a bracket 123 secured to a laterally sliding plate 124 which is a part of the work piece supporting member. The screw is caused to rotate with the shaft by means of a key 125 slidable in a key-way 126 extending from the left hand end of the shaft to the shoulder near the right hand end. The screw is journaled in a bearing 127 which is a part of the slide 95 and by having a flange 128 to the left of the bearing together with a collar 129 on the right of the bearing the screw will move in unison with the slides 95 and 124 when operated by the pinion 93.

The slide 95 is dovetailed to the base and is provided with an adjusting plate 130 (Fig. 14) and screws 131 to take up the wear on the slide. Slide 124 is connected to slide 95 in the same manner that slide 95 is connected to the base. As it is necessary that both slides move in unison when being operated by the pinion 93 a locking device is provided to hold the upper slide 124 rigid with the lower slide 95. This device consists of a rod 135 supported by brackets 136 and 137 fastened to the slide 124. An eccentric 138 (Figs. 16 and 17), formed on the right hand end of this rod, engages one end of a pin 139 which is freely mounted in the slide. The other end of the pin engages a plate 140 which is positioned between the two slides and by turning the rod the eccentric will force the pin inward causing enough friction between the parts to overcome any lost motion in the screw 122. A screw 141 cooperates with a groove in the rod to prevent a lateral movement of the same.

When engraving characters similar to those shown in Fig. 8ᴮ and the work piece supporting member is moved laterally by turning the shaft 115, a graduated scale 145 is used to gauge the lateral movement of the work piece in moving from one character to another. The scale 145 (Figs. 1ᴮ and 8ᴬ) is held in place on the frame by clamps 146 and 147, and cooperating with the scale is a pointer 148 which is mounted on a right angle arm 149 secured to the work piece supporting member. Scales of different graduations are provided for the various proportions of characters. The scale shown has the figure "6" on the right hand end which is the number of the scale and represents characters of certain proportions, a table of proportions being provided from which the scale is selected.

In moving the work piece from a character such as "N" to an "I", the scale can not be used, so there is provided a graduated dial 150 (Figs. 1ᴮ and 22) mounted on the forward end of the shaft 115, which is used in connection with a table to determine the amount of rotation of the shaft to move the work piece the proper distance. This same method is used in moving from the letter "I" to the next character, after which if the characters following are of the same size as the letter "N" the scale 145 is moved into alinement with the pointer and the operator proceeds as before.

The slide 124 (Fig. 18) has formed upon its top surface, guides 151 and 152 to which is fitted a cross slide 153 provided to move the work piece forward and backward, or at right angles to the slides 95 and 124. Fastened to the bottom of the cross slide is a rack 154 which meshes with a gear 155 fixed on a shaft 156 journaled in bearings 157, 158 and 159. On the right hand end of this shaft is a worm gear 160 (Fig. 2ᴮ) in mesh with a worm 161 fixed on a shaft 162, one end of which is journaled in a swivel bearing 163 mounted in a bracket 164. This bracket is supported by the bearing hub 159 (Fig. 8ᴬ) and held at any desired angle by a clamp screw 165 (Fig. 2ᴮ). Washers 166 are placed at each end of the bearing 163 to take the thrust of the shaft 162. There is also an adjusting collar 167 screwed on the end of the shaft and held in place by a clamp screw 168. The forward end of the shaft is journaled in a bearing 169 (Fig. 12) which provides adjustment between the worm and worm gear. This bearing rests upon an adjusting screw 170 and is held in contact with this screw by a spring 171 and screw 172 mounted in a plate 173 fastened to the bracket. The bearing is held against lateral movement by a pin 174 passing through a slot 175 and supported by the bracket 164.

Mounted upon the forward end of the bearing 169 (Fig. 12) is a graduated index dial 180, held in place by a set screw 181. Freely mounted upon this dial is a rotatable plate 182 which has freely mounted upon it a companion rotatable plate 183. A screw 184 (Fig. 1ᴮ) when tightened will lock both plates together causing them to rotate in unison.

Pinned to the shaft 162 is a handle 185 (Figs. 1ᴮ and 8ᴬ) having a spring-actuated plunger 186 which engages any one of the holes 187 in the index dial. A washer 188 freely mounted upon the shaft 162 holds the plates 182 and 183 on the dial.

The dial is graduated into one hundred divisions, and each division represents a forward or backward movement of the work piece supporting member of one-thousandth of an inch. The plates 182 and 183 can be set to any number of divisions and be used as a guide in moving the handle from one index to another.

Adjustable stops are provided to control the extreme lateral movement and the forward and backward movement of the slides. A screw 192 (Figs. 8ᴬ and 18), fastened in the slide 124 and projecting to the left through an opening in a plate 193, controls the lateral movement of the slide. This screw is provided with two knurled nuts 194 which are placed on opposite sides of the plate 193 to stop the movement of the slide, the plate being fast to the frame.

The extreme forward and backward movement of the slide is controlled by a bracket 195 (Fig. 8ᴬ) secured to the slide 124 and cooperating with a screw 196 having two adjusting nuts 197. The screw is supported at each end by brackets 198 and 199 which are fastened to the slide 153.

Mounted upon the top surface of the cross slide 153 is a rotatable disk 200 (Figs. 8ᴬ and 18), which is attached to the cross slide by two bolts 201 and 202, the heads of which are fitted to a circular groove 203 formed in the slide. An arm 204 pivoted on a screw stud 205, and having a projection 206 cooperating with notches 207 formed in the rotatable disk, retains the disk in the various angular positions in which it may be placed. The arm is constantly spring pressed by a spring 208 compressed between a plunger 209 and a lug 210.

Securely fastened to the rotatable disk by two cap screws 211 and 212 is a cylindrical member 213 having formed on its upper end a guideway having angular side walls 214 and 215 to receive a work piece fixture 216. This work piece fixture is securely held in place by three clamp screws 217 mounted in the cylindrical member.

The work piece fixture may vary in form and size according to the work piece. The fixture shown in the drawing is adapted to receive plates of various thicknesses which rest upon spring actuated plungers 218 (Figs. 10, 18, 23 and 24). These plungers, which vary in numbers and locations according to the work piece, are fitted in holes in the fixture and are retained in place by a screw 219, the head of which overlaps a shoulder 191 formed on the plunger. A second shoulder 220 formed on the plunger is for the purpose of retaining the plunger in an inoperative position when the plunger is depressed and turned in either direction to place the shoulder 220 under the head of the screw 219. Owing to the differences in designs of the work pieces it is desirable to disable various plungers when not required to support the work piece. These plungers form a flexible support for the work, which is necessary where the work piece is of thin material and has not a perfectly flat surface. The plungers cooperate with a pressure foot to give uniform depth to the engraving which will hereinafter be described.

The work piece 221 is held in the fixture by two clamping bolts 222 and 223 on the left side and levers 224 and 225 on the right side, together with plungers 226 and 227, which are actuated by screws 228 and 229 respectively. The levers are fulcrumed on bolts 230 and 231 which have slotted heads for clamping the levers in position. The plungers 226 and 227 force the work piece against locating pins 232 and 233.

Fastened to the frame are two upright brackets 240 and 241 (Fig. 18) supporting a rod 242 on which is pivoted a swinging member 243 which supports the tracing pin and cutting tool mechanism. The weight on this member is distributed so as to nearly balance the same on its pivot and make the raising and lowering as easy as possible.

When the cutting tool is engaged with the work piece the swinging member assumes a horizontal position with a pin 244 (Fig. 2^A) projecting laterally from the member to engage with a latch 245 which slides in a groove formed in a piece 246. This piece is fixed to a bracket 247 supported by the frame. In the forward end of the latch is a pin 248 which engages the bifurcated end 249 of an operating lever 250 which is fulcrumed on a pin 251 supported by the frame. Pulling the lever forward causes the latch to slide forward, which forces the pin 244 down the inclined slot 252, the pin having two flat places on opposite sides and at a corresponding angle to the slot. Moving the lever in the opposite direction will cause the swinging member to rise sufficiently to disengage the tracing pin from the master plate and simultaneously the cutting tool from the work piece so that both may be moved to another position.

Referring to Fig. 18, the swinging member 243 when moved in a counterclockwise direction will contact with a spring plunger 253 which is supported by a plate 254 secured to the bracket 241, and retard the movement of the member.

A tracing pin 255 (Fig. 5), securely held by a supporting member 256, is caused to follow the outline of the design in the master plate and in so doing automatically moves the cutting tool by intermediate mechanism which will hereinafter be described.

The supporting member is attached to a horizontal plate 257 (Fig. 1^A) which is fitted to guides 258 and 259 allowing a universal horizontal movement of the tracing pin supporting member. Fastened to the top of the horizontal plate by a cap screw 260 is a guide plate 261 (Fig. 4^B) which is fitted to an arm 262 and adapted to slide laterally on the same. This arm is pivoted on a stud 263 fastened to the swinging member 243.

A bracket 264 which is fastened to the guide plate 261 has a stud 265 upon which is pivoted one end of a link 266. The other end of the link is pivoted on a lever 267 fulcrumed on a stud 268 supported by a plate 269 fastened to the arm 262. A link 270 which is pivoted in the center of the lever 267 forms a connection between the lever and a sliding member 271 fitted to the arm 262.

There is pivoted to the sliding member by a stud 275, one end of a link 276, the other end of which is pivoted by a stud 277 to a lever 278 (Fig. 4^A). This link transmits motion from the arm 262 to the lever 278.

When the tracing pin supporting member is in the central position, as shown in Fig. 4^B, the ratio of leverage between this point and the pivot point 275 for the link 276 is two to one. In order to maintain the same ratio of leverage between these points when moving the tracing pin laterally, this compensating mechanism is applied intermediate of the tracing pin support and the pivot point 275 for the link 276.

The lever 278 (Fig. 4^A), which is oscillated by the forward and backward movement of the tracing pin supporting member, is fulcrumed on an adjustable pivot 279 which is fitted to a screw 280 journaled in the frame, the screw being manually operated by placing the operating handle 54 (Fig. 8^B) upon the forward end of a shaft 281 (Figs. 2^A and 4^B) and turning the same in either direction to move the pivot along the screw. The screw 280 is connected to the shaft 281 by the bevel gears 282 and 283. The shaft is journaled in bearings 284 and 285 supported by the swinging member 243.

The pivot 279 (Fig. 7) is fitted to a formed groove 286 which permits the pivot to slide laterally and by having angular side walls 287 and 288 the pivot is held rigid by turning a handle 289, which cooperates with a screw thread formed on the upper part of the pivot. By turning the handle in a clockwise direction the parts intermediate the handle and the member 243 are drawn closely together thereby holding the pivot rigid. There is a collar 290 between the handle and a plate 291 which rests upon a bushing 292. Between this bushing and the member 243 is a washer 293. Surrounding the bushing 292 is a flanged piece 294 having a round hole fitted to the bushing 292 with the outside walls squared to fit the opening 295 in the lever 278. Attached to the plate 291 is a pointer 296 which cooperates with a graduated scale 297 and which will hereinafter be described. The left hand end of the lever 278 (Fig. 1^A) has fast to it a hardened plate 298 which cooperates with a block 299 to support the end of the lever.

The cutting tool supporting member in moving forward and backward in the various lateral positions of operation will be guided to move in planes parallel to each other by a yoke 306 (Fig. 4^A) pivoted to the lever 278 by a stud 305 with the bifurcated ends 308 and 309 of the yoke forming bearings for pins 310 and 311 which are secured to a plate 307 supporting the cutting tool member. The bifurcated end of the yoke is of sufficient width to permit the required lateral movement of the plate 307. The yoke 306 is held to extend in the same general direction by two parallel links 312 and 313. These links are pivoted at their left hand ends to the member 243 and at their right hand ends to the yoke 306 by studs 314 and 315 respectively.

The lateral motion of the cutting tool supporting member is conveyed from the tracing pin supporting member by a plate 319 (Figs. 1A and 4B), the left hand end of which has an opening 320 engaging with an oblong block 321 freely mounted upon the cap screw 260. The block rests upon a bushing 322 which surrounds the cap screw and rests upon the guide plate 261 (Fig. 5). A washer 323 beneath the head of the cap screw assists in holding the parts in place with sufficient clearance to enable free movement of the tracing pin supporting member.

The plate 319 is caused to move laterally in a straight line by a guide member 324 which is fitted to an elongated opening 325 formed in the plate, this guide member being rigid with the swinging member 243.

Pivoted to the right hand end of the plate 319 is a lever 326 which is fulcrumed on an adjustable pivot 327 similar to pivot 279 (Fig. 7). The pivot is fitted to a screw 328 (Fig. 4A) and is moved by applying the handle 54 to the front end 329 of the screw shaft, which is journaled in the bearing 285. The pivot is made rigid by turning the handle 330 which cooperates with various parts similar to those shown in Fig. 7 and previously described.

The front end of the lever 326 is guided in its horizontal oscillating movement by plates 334 and 335 bolted to upwardly projecting bosses 336 and 337. Formed on the under side of the lever is a boss 338 (Fig. 2A) which contacts with the lower plate 335. Between the plates and surrounding the bolts are spacing collars 339 and 340 (Fig. 1A).

As the tracing pin supporting member is moved laterally by the operator, the cutting tool supporting member will be guided to move laterally, in the various positions of operation, in horizontal planes parallel to each other, by a yoke 341 pivoted to the lever 326 by a stud 342 with the bifurcated ends 343 and 344 of the yoke forming bearings for pins 345 and 346 which are secured to the plate 307. The yoke 341 is caused to maintain a uniform horizontal lateral relation to the rigid parts of the machine by two parallel links 347 and 348. These links are pivoted at their forward ends by studs 349 and 350 to the member 243, and at their opposite ends to the yoke 341 by studs 351 and 352. Therefore the cutting tool is moved universally in a horizontal plane by the two yokes and their associate mechanism.

The lever and link pivots are constructed with ball bearings so as to eliminate as much as possible lost motion between the tracing pin and the cutting tool. Referring to Fig. 3, which shows a bearing in section, a stud 353 secured in a boss 354 has an adjustable cone 355 threaded on its upper end. This cone contacts with numerous steel balls 356 supported by a cup 357 which is securely held in the link 348. The cone is locked in adjusted position by a nut 358. A dust proof washer 359 is placed between the cone and the cup. The link rests upon a washer 360 which is of an anti-friction nature.

The cutting tool supporting plate 307 (Figs. 4A and 18) rests upon bosses 365 and 366 and is held in place by two plates 367 and 368 resting upon spacing collars 364 surrounding the bolts 369, 370, 371 and 372. The openings 363 in the plate 307 through which the bolts and spacing collars pass are sufficiently large to enable the plate to move universally its fullest extent.

In this plate is mounted a cutting tool spindle bearing 373 (Fig. 20) which is held rigid with the plate by a nut 374 cooperating with a shoulder 375 formed on the bearing. On the lower end of the bearing there is attached an oil retainer 376, and securely fastened inside the opening in the bearing is a sleeve 377 which is of anti-friction metal. Bolted to the top of the bearing is a cylindrical member 378 which supports a driving pulley 379, secured to a ball-bearing member 380 by plates 381 and 382 fastened together by screws 383. Cooperating with the member 380 is a companion member 384 which is securely fastened to the cylindrical member by a nut 385.

Projecting upward from the plate 382 are driving pins 386 and 387 which engage with holes in a disk 388 securely fastened to a spindle 389 by a key 390 and a clamp nut 391. This nut is locked in place by a screw 392.

Surrounding the spindle 389 and securely fastened to the same is a flanged sleeve 393 which supports the downward thrust of the spindle. Below the flange on the sleeve is a washer 394 which rests upon a bushing 395 fitted to slide in the bearing 373. Resting upon a shoulder formed around the spindle is a collar 396, and between the collar and the bushing is a washer 397. The bushing forms a bearing for the upper end of the spindle, and also is used in adjusting the vertical position of the spindle which controls the depth of the engraving. This adjusting is done by two adjusting levers 398 and 399 fulcrumed on rods 400 and 401 respectively and engaging with depressions 402 and 403 formed in the bushing. These levers are adjusted by a right hand screw 404 and a left hand screw 405. The screw 405 is fitted in a bushing 406 which is securely held in a frame 407 fastened to the bearing 373, and engages a depression formed in the lever 398. Screw 404 passes through a hole in screw 405 and through openings in both levers and has fitted to its lower end a nut 408, the top surface of which is convex to cooperate with a depression formed in the lower surface of the lever 399 to prevent the nut from turning when the screw is adjusted.

Formed in the lower end of the spindle 389 is a tapered opening 414. A split collet 415 cooperates with this opening to securely hold a cutting tool 416 when the collet is drawn upward by a screw 417 which engages with a tapped hole in the upper end of the collet. This screw passes upward through an opening in the center of the spindle and at its upper end is provided with a head 418 which overlaps the spindle and is square in cross-section to receive a wrench for effecting adjustment.

A pin 419 passes through an opening in the center of the screw, with the lower end resting upon the top of the cutting tool. By the aid of this pin the cutting tool is forced downward, when the collet is slightly released, to contact any form of a gauge which will determine the relation of the cutting tool to the surface of the work piece.

Referring to Fig. 18, a presser-foot 420, which is fastened to the swinging member 243 and used with certain classes of work, such as shown in the drawings, will maintain a uniform depth of engraving, the cutting tool being positioned so that its point is a certain distance below the lower face of the presser-foot. The work piece 221 being supported by spring plungers, the presser-foot will force the work piece slightly downward so that all parts of the engraving surface will be in the same relative position to the cutting tool.

When adjusting the cutting tool the spindle is held rigid with the spindle bearing by engaging a plunger 421 with a hole in the pulley 379. This plunger can be raised to a position whereby it can be turned sufficiently to allow a projection 422 to rest upon the surface 423.

The cutting tool moves a proportionately less distance than the tracing pin which is controlled by the adjustable fulcrums 279 and 327 (Fig. 4ᴬ) previously described. These fulcrums are positioned by the aid of a scale which is graduated to indicate various proportions of movement between the two members referred to.

A scale 424 (Fig. 2ᴬ) which is employed in adjusting the fulcrum which controls the lateral movement of the cutting tool is fastened to the lever 326 and cooperating with it is a pointer 425 which is attached to the fulcrum 327 (Fig. 4ᴬ). The position of the pointer in Fig. 2ᴬ signifies that the cutting tool will move laterally one-sixth as far as the tracing tool or in a ratio of 1 to 6.

A similar scale 297 and pointer 296 are provided for the fulcrumed 279 (Fig. 4ᴬ) which controls the forward and backward movements of the cutting tool.

Compressed air, which may be supplied from any convenient source, is conveyed to the machine by a pipe 426 (Fig. 19) and passes through a valve 427 and a pipe 428 to a point near the cutting tool to remove the small particles from the work piece during the process of engraving.

The valve 427 controls the passage of the air from the air supply to the work piece. When the swinging member 243 is raised slightly from its engraving position, an arm 429 attached to the member 243 will be moved in a clockwise direction to allow a spring 430 to close the valve. When the member 243 is lowered to its engraving position the arm 429 contacts with a plunger 431 and moves it a sufficient distance to open the passage between the air inlet chamber 432 and the outlet chamber 433.

The cutting tool is rotated at high speed by power furnished by an electric motor 435 (Fig. 1ᴬ) which is mounted upon the swinging member 243. This power is transmitted from the motor to the cutting tool spindle by a belt 436 cooperating with a pulley 437 secured to the motor shaft, idler pulleys 438 and 439 supported by a bracket 440, and tension idlers 441 and 442 mounted on an arm 443 under spring tension. Other idler pulleys 444 and 445 are supported by a bracket 446 fixed to the cutting tool spindle bearing. With this means of guiding the belt the cutting tool supporting member is permitted to move universally in a horizontal plane.

The electric current for operating the motor may come from any source of supply, and enters the motor through a controller box 452 which is fastened to the frame 40 (Fig. 1ᴮ).

Referring to Fig. 21, which shows designs, figures and characters of various sizes representing the variety of engraving that can be done with a standard size master plate, such as shown in Fig. 9, the engraving is not limited to horizontal work, but can be executed at various angles, and horizontal, vertical and angular lines can be made as shown. Also, the machine may be employed in making embossed characters as well as depressed characters, and is also adapted to be used in making stencils.

While the form of mechanism shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a frame, a master plate holder and a work piece supporting member supported by said frame, a swinging member pivoted to said frame, a tracing pin member and a cutting tool member supported by said swinging member, and manipulative means for retaining said swinging member in operative position.

2. In a machine of the class described, a cutting tool, a cutting tool supporting member, a work piece supporting member, and means supported by said cutting tool supporting member, for positioning the engraving surface of the work piece relatively to said cutting tool.

3. In a machine of the class described, the combination of a plurality of master plates, a laterally movable master plate holder, a laterally movable table supporting said master plate holder, a frame member supporting said movable table, and manipulative means for giving movement to said movable table.

4. In a machine of the class described, the combination of a plurality of master plates, a master plate holder arranged for lateral movement, a movable table, clamps for fastening said master plate holder to said movable table, and manipulative means for giving lateral movement to said movable table.

5. In a machine of the class described, the combination of a laterally movable master plate holder, a laterally movable table supporting said holder, a frame member supporting said table, means for moving said table, and manipulative means for permitting movement of said master plate holder independent of said table moving means.

6. In a machine of the class described, a work piece fixture, flexible means for supporting the work piece in said fixture, means cooperating with said flexible means for retaining said work piece, and manipulative means for laterally fastening said work piece in said fixture.

7. In a machine of the class described, a work piece fixture, a work piece flexible supporting means, means for fastening said work piece, and means for making said work piece flexible supporting means ineffective.

8. In a machine of the class described, the combination of a tracing pin holder adapted to move laterally, a cutting tool supporting member adapted to move laterally and in unison with said tracing pin holder, a plate movable laterally with said tracing pin holder, an adjustable fulcrum, a lever having one end directly attached to said plate and the other end to said adjustable fulcrum to move said cutting tool supporting member laterally proportionately to the movement of said tracing pin holder, and means connecting said lever with said cutting tool supporting member.

9. In a machine of the class described, the combination of a tracing pin holder adapted to move laterally, a cutting tool supporting member adapted to move laterally and in unison with said tracing pin holder, a plate moving laterally with said tracing pin holder, an adjustable fulcrum, a lever having one end directly attached to said plate and the other end to said adjustable fulcrum to move laterally said cutting tool supporting member proportionately to said tracing pin, and a yoke member connecting said lever with said cutting tool supporting member.

10. In a machine of the class described, the combination of a tracing pin holder, a cutting tool supporting member, a lever, a fulcrum therefor adjustable in the direction of the length of the lever, a connecting member for moving said lever by the lateral motion of said tracing pin holder, a connecting means for conveying motion from said lever to said cutting tool supporting member, and means for guiding said supporting member to cause it to move laterally in a straight line.

11. In a machine of the class described, the combination of a tracing pin holder adapted to move laterally, a cutting tool supporting member adapted to move laterally, a plate movable laterally with said tracing pin holder, a lever directly connected to said plate, a changeable fulcrum therefor adjusting the proportional movement between said tracing pin holder and said cutting tool supporting member, and means connecting said lever with said cutting tool supporting member for moving said member laterally.

12. In a machine of the class described, the combination of a tracing pin holder adapted to move laterally, a cutting tool supporting member adapted to move laterally, a plate movable laterally with said tracing pin holder, a lever directly connected to said plate, a changeable fulcrum therefor, and a yoke member connecting said lever with said cutting tool supporting member for moving said member laterally.

13. In a machine of the class described, the combination of a tracing pin holder adapted to move laterally, a cutting tool supporting member adapted to move laterally, a plate movable laterally with said tracing pin holder, a lever directly connected to said plate, a fulcrum therefor, an adjusting screw supporting said fulcrum, and means connecting said lever with said cutting tool supporting member for moving said member laterally.

14. In a machine of the class described, the combination of a tracing pin holder adapted to move laterally, a cutting tool supporting member adapted to move laterally, a plate movable laterally with said tracing pin holder, a lever directly connected to said plate, a yoke member connecting said lever with said cutting tool supporting member, a screw shaft, an adjustable fulcrum for said lever mounted on said screw shaft, and manipulative means for holding said fulcrum rigid with said lever.

15. In a machine of the class described, the combination of a tracing pin holder mounted for universal movement in a horizontal plane, a cutting tool supporting member mounted for universal movement in a horizontal plane, and an adjustable means including a screw shaft intermediate of said tracing pin holder and said cutting tool supporting member for transmitting motion from said tracing pin holder to said cutting tool supporting member in a proportionately less extent.

16. In a machine of the class described, the combination of a tracing pin holder mounted for universal movement in a horizontal plane, a cutting tool supporting member mounted for universal movement in a horizontal plane, and manipulative adjustable means including a screw shaft for conveying motion from said tracing pin holder to said cutting tool supporting member.

17. In a machine of the class described, the combination of a frame member, a tracing pin holder supported by said frame member, a cutting tool supporting member, a lever having an adjustable fulcrum, means for holding said fulcrum rigid, a connecting plate for moving said lever by the lateral movement of said tracing pin holder, a yoke member pivoted on said lever and attached to said cutting tool supporting member to move said supporting member laterally a less proportional distance than said tracing pin holder, and parallel links attached to said yoke member to guide said yoke member in its lateral movement.

18. In a machine of the class described, the combination of a frame member, horizontal guide members supported by said frame member, a tracing pin holder supported between said guide members for movement forward and backward in a horizontal plane, a cutting tool supporting member adapted to move in like manner and in unison with said tracing pin holder, and an adjustable means intermediate of said tracing pin holder and said cutting tool supporting member for transmitting motion from said tracing pin holder to said cutting tool supporting member in a proportionately less extent.

19. In a machine of the class described, the combination of a tracing pin holder mounted for forward and backward movement in a horizontal plane, horizontal guide members, a cutting tool supporting member mounted between said horizontal guide members for forward and backward movement in a horizontal plane, and manipulative adjustable means for conveying motion from said tracing pin holder to said cutting tool supporting member.

20. In a machine of the class described, the combination of a frame member, a tracing pin holder supported by said frame member and adapted to move forward and backward, a cutting tool supporting member, an arm pivoted on said frame member and oscillated by said tracing pin holder, a lever having an adjustable fulcrum, manipulative means for holding said fulcrum rigid, a link connecting said arm with said lever, a yoke member pivoted to said lever and attached to said cutting tool supporting member to move said supporting member forward and backward a less proportional distance than said tracing pin holder, and parallel links attached to said yoke member to guide said yoke member in its forward and backward movement.

21. In a machine of the class described, the combination of a frame member, a tracing pin holder supported by said member and adapted to move forward and backward, a cutting tool supporting member adapted to move in like manner and in unison with said tracing pin holder, an arm pivoted on said frame member and moving with said tracing pin holder, a lever having an adjustable fulcrum, a link connecting said arm with said lever, and a means connecting said lever with said cutting tool supporting member to move simultaneously and in the same direction with said tracing pin holder.

22. In a machine of the class described, the combination of a frame member, a tracing pin holder supported by said member and adapted to move forward and backward, a cutting tool supporting member adapted to move forward and backward in unison with said tracing pin holder, an arm pivoted on said frame member and oscillated by said tracing pin holder, a lever, having an adjustable fulcrum, means connecting said lever with said cutting tool supporting member, and other means for guiding said connecting means to cause it to move in a straight line.

23. In a machine of the class described, the combination of a frame member, a tracing pin holder supported by said member and adapted to move forward and backward in a horizontal plane, a cutting tool supporting member adapted to move in like manner and in unison with said tracing pin holder, an arm pivoted on said frame member and oscillated by said tracing pin holder, a lever having an adjustable fulcrum, means connecting said lever with said arm, and means connecting said lever with said cutting tool supporting member to move said member forward and backward in a straight line.

24. In a machine of the class described, the combination of a tracing pin holder mounted to move universally in a horizontal plane, a pivoted arm oscillated by said tracing pin holder, a lever having an adjustable fulcrum, a link having one end pivoted to said lever, the other end pivoted to a plate freely mounted on said arm, and means for sliding said plate on said arm by the lateral movement of said tracing pin holder.

25. In a machine of the class described, the combination of a tracing pin holder mounted to move universally in a horizontal plane, a pivoted arm oscillated by said tracing pin holder, a lever having an adjustable fulcrum, a link pivoted on said lever and connected to said arm by a movable connection, and means intermediate said tracing pin holder and said movable connection for moving said connection by the lateral movement of the tracing pin support.

26. In a machine of the class described, the combination of a tracing pin holder adapted to move universally in a horizontal plane, a pivoted arm oscillated by said tracing pin holder, a lever having an adjustable fulcrum, a movable member loosely mounted on said arm, a link pivoted to said movable member and connected with said lever, and means intermediate said tracing pin holder and said movable member to move said member laterally in proportion to the lateral movement of said tracing pin holder.

27. In a machine of the class described, the combination of a tracing pin holder adapted to move universally in a horizontal plane, a pivoted arm oscillated by said tracing pin holder, a movable member freely mounted upon said arm, a lever having an adjustable fulcrum, manipulative means for adjusting said fulcrum, locking means for making said adjustable means ineffective, means connecting said lever with said movable member, and means connecting said movable member with said tracing tool holder to move said member laterally in proportion to the lateral movement of said tracing pin holder.

28. In a machine of the class described, the combination of a cutting tool supporting member, a cutting tool, a work piece supporting member, and means supported by said cutting tool supporting member engaging the top surface of the work piece to control its relation to said cutting tool.

29. In a machine of the class described, the combination of a cutting tool suporting member, a cutting tool, a work piece supporting member having flexible means for supporting a work piece, and means supported by said cutting tool supporting member for engaging the top surface of the work piece controlling the depth of said cutter in the work piece.

30. In a machine of the class described, the combination of a cutting tool supporting member, a cutting tool, a work piece supporting member including flexible means for supporting a work piece, and means supported by said cutting tool supporting member for controlling the depth of said cutter in said work piece.

In testimony whereof I affix my signature

EDWARD H. KUHLMAN.